United States Patent [15] 3,679,821

Schroeder [45] July 25, 1972

[54] TRANSFORM CODING OF IMAGE DIFFERENCE SIGNALS

[72] Inventor: Manfred Robert Schroeder, Lower Saxony, Germany

[73] Assignee: Bell Telephone Laboratories, Incorporated, Murray Hill, N.J.

[22] Filed: April 30, 1970

[21] Appl. No.: 33,382

[52] U.S. Cl. ....................178/6, 178/DIG. 3

[51] Int. Cl. ....................H04n 7/12

[58] Field of Search ....................178/6, 15 AP, 68; 179/15.55; 328/13, 176; 325/38 B, 42; 332/11 D; 340/146.1, 347

[56] References Cited

UNITED STATES PATENTS 3,502,986 3/1970 Lucky ....................325/42

3,522,383 7/1970 Chang ....................328/42

2,732,424 1/1956 Oliver ....................178/5

3,492,578 1/1970 Gerrish et al. ....................325/41

*Primary Examiner*—Robert L. Griffin

*Assistant Examiner*—Barry Leibowitz

*Attorney*—R. J. Guenther and William L. Keefauver

[57] ABSTRACT

Immunity to transmission errors and worthwhile bandwidth reduction are achieved by distributing the difference signal, developed in differentially coding an image signal, over a spatially large interval or area, and transmitting the coded distributed signal instead of the image or differential signal. Line or frame image difference signals are, accordingly, dispersed by transformation prior to coding, e.g., by quantizing, and transmission, preferably by means of the Fourier, Hadamard, or other unitary matrix transforms, to "scramble" them relatively homogeneously in the domain of the transformed variable. Each transmitted image element thus represents a weighted sum of many or all of the elements of the corresponding line or frame. Simpler coding and other economies are achieved, particularly for relatively slowly varying sequences of images.

2 Claims, 4 Drawing Figures

PATENTED JUL 25 1972 3,679,821

INVENTOR
M. R. SCHROEDER
BY A. E. Hirsch Jr.
ATTORNEY

TRANSFORM CODING OF IMAGE DIFFERENCE SIGNALS

This invention relates in general to the modification of signals to facilitate their transmission, and particularly to the reduction of their source rates and, hence, to a compression of the required channel capacity or frequency bands. Its principal object is to compress the channel capacity or the band of frequencies necessary for the transmission of picture signals.

BACKGROUND OF THE INVENTION

For some time it has been recognized that certain statistical principles can be applied to communication systems in order to permit message signals to be efficiently transmitted over a channel whose capacity is somewhat less than the source rate of signals representative of the messages. For most speech and picture message signals, bandwidth reduction is achieved by capitalizing on the fact that most of the signals are not random but exhibit a considerable degree of correlation, semantic, spatial, spectral, temporal, or the like. By reducing the redundancy in such signals, economies may be achieved.

This invention is concerned particularly with the reduction of redundancy in picture signals, e.g., television signals.

1. Field of the Invention

The fact that successive frames of a motion picture film or television signal are often very nearly alike has led to the consideration of arrangements which determine the relationship, e.g., correlation, between the gray values of picture elements at one time to those at another, and utilize this relationship in preparing coded signals for transmission. A number of different proposals utilizing this basic theme have been described in the art and some have found commercial application.

2. Description of the Prior Art

In general, two different approaches to the reduction of signal redundancy have been proposed. On the one hand, since successive frames of a television rendition of a scene are often very nearly alike, it is advantageous to transmit only the difference between successive image frames. Thus, signal redundancy may be materially reduced by periodically sampling a message wave to be transmitted, predicting the succeeding value of the signal, comparing the predicted value with the actual value, and then transmitting only the difference, or the error in prediction. At the receiver, the received error signal and a computed, i.e., predicted, signal equivalent to the predicted value developed at the transmitter are combined to yield a replica of the original signal.

Another approach has been to encode the image signal, for example, by a two-dimensional Fourier transformation technique. The transformed signal is quantized, coded, and transmitted to a receiver station. At the receiver station an inverse Fourier transform of the received signal is developed from received and decoded signals to reconstruct a close approximation to the original image. Bandwidth economy is achieved with this approach by reducing redundancy in the spatial-frequency domain.

Both of these techniques are effective to a degree; they achieve bandwidth economies on the one hand by reducing signal redundancy and on the other by lowering the entropy of the signal.

SUMMARY OF THE INVENTION

In accordance with this invention, and in furtherance of its various objects, signal bandwidth economies are achieved by seizing upon the best features of both of the aforementioned techniques and by combining them both to reduce signal redundancy and to lower coded signal entropy. Rather than transmit only difference signals resulting from errors in prediction, and rather than merely transforming an image signal prior to transmission, it is in accordance with this invention to combine the best features of each of these techniques. In its simplest terms, the invention serves to transform error signals developed in a predictive coding arrangement to lower the entropy of the error signal. Surprisingly, this technique yields a superior specification of television picture signals together with simpler coding and greater transmission economy.

Consider a picture scene with pronounced contours between relatively uniform areas. The difference signal developed for transmission will then be small for most picture areas. As the scene changes as, for example, by continuous motion, error signal amplitudes will increase in the contoured portions, but remain near zero for the uniform areas. The difference signal during times of change is therefore nonhomogeneous and more extensive coding is required for the larger difference signals than for the near zero difference signals. Because some areas require full range coding, the system is inefficient. However, by transform coding the difference signals, in accordance with the invention, the resultant coded signal becomes spatially more homogeneous. Advantageously, Fourier coding, for example, using the Fast Fourier Transform technique, or Hadamard matrix transform coding, using a high speed computational algorithm, may be used.

Thus, in addition to predictions based on within-frame or frame-to-frame correlations of picture brightness values, and in accordance with the invention, a "scrambling" transformation maps unpredictable components of a frame of picture information into a two-dimensional, spatially homogeneous function. Both scrambling and subsequent quantizing may be complex-valued operations. For pictures with pronounced contours, the difference signal will be zero or small for most picture elements, the scrambled signal will be spatially more homogeneous and its statistics will be relatively independent of the location of the changed picture element within a frame. Advantageously, no address coding is required to specify the picture elements that have changed and the entire coded signal may be devoted to the transmission of brightness information.

To avoid the accumulation of coding errors, it is in accordance with the invention to organize the transform coder, signal quantizer, and transform decoder in a feedback loop arrangement at the transmitter and to provide equivalent decoder apparatus at the receiver.

BRIEF DESCRIPTION OF THE DRAWINGS

The invention will be more fully understood from the following detailed description of illustrative embodiments thereof, taken in connection with the appended drawings in which.

DETAILED DESCRIPTION

Figure 1:
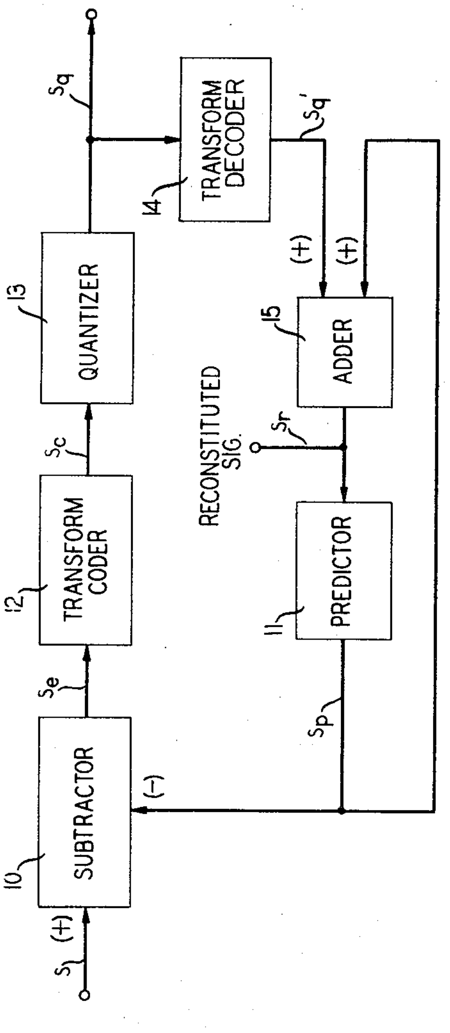
FIG. 1 is a schematic block diagram showing apparatus for transform coding prediction error signals in accordance with the invention.

A schematic block diagram of apparatus for transform coding image difference signals in accordance with the invention is illustrated in FIG. 1. In essence, the apparatus determines the difference between the momentary value of an incoming frame of video signals and a predicted value of the frame of signals, i.e., the error in prediction, and disperses the difference by transforming it into a spatially homogeneous signal. This transformed signal is then quantized for efficient transmission.

In the apparatus of FIG. 1, video signals $s$, which may be derived from a conventional camera tube or video store is supplied to one input of subtractor 10. Signals $s$ may be supplied either serially, i.e., on a point-by-point basis or in parallel as a complete frame of picture elements. Moreover, the signals may be in analog form although preferably they are in digital form in order to simplify subsequent processing. Assuming for this illustrative embodiment that the signals are in digital form they are band limited, sampled, and coded into an $n$-bit pulse code signal, for example, using any conventional technique, before they are supplied to subtractor 10. Thus, whether in digital or analog form, the resulting frame signals are delivered to subtractor 10. Subtractor 10 is also supplied with predicted values $s_p$ of signals $s$ from a closed loop predictor, to be described hereinafter, which produces signals which closely match the actual values of signals $s$. Any difference between the frame of predicted value signals and the actual value of a frame of signals constitutes an error in prediction and results in a difference signal $s_e$. The difference signal thus represents the values of those picture elements within a frame which cannot satisfactorily be predicted on the basis of past or future values. This error signal must be transmitted to a receiver, equipped with comparable prediction apparatus, to correct the predicted value developed at the receiver in order to reconstitute the signal applied at the transmitter.

Since difference signals generally occur in a television frame of signals only when there has been motion in the scene between frames, sizable error signals usually are highly punctuate and confined to relatively small areas within the frame. In order to distribute these punctuate signals over the entire frame, it is in accordance with the invention to supply difference signals $s'$ to transform coder 12 wherein they are distributed or "scrambled" to occupy more nearly the entire frame area.

Scrambling by signal transformation may be achieved in a number of ways. Among the many possible operators, the two-dimensional discrete Fourier transformation and the Hadamard transformation are particularly attractive. Both disperse a highly punctuate signal over an entire frame of information. Advantageously, both the transform and the inverse transform of the Fourier and Hadamard arrangements can be instrumented either optically or by high-speed computational algorithms. The Fourier transform and its high speed, or Cooley-Tukey, algorithm is, of course, well known in the art. The Hadamard transform, although less well known, has been receiving considerable attention recently. A Hadamard matrix is a real valued, square array of plus and minus ones whose rows and columns are orthogonal to one another. For example, $$H_2=\begin{bmatrix}1 & 1\\ 1 & -1\end{bmatrix}=\begin{bmatrix}+ & +\\ + & -\end{bmatrix} \qquad (1)$$

$$H_4=\begin{bmatrix}+ & + & + & +\\ + & + & - & -\\ + & - & + & -\\ + & - & - & +\end{bmatrix} \qquad (2)$$

The product of a matrix H and its transpose is the identity matrix, and the rows and columns may be exchanged with one another without affecting the orthogonality properties of the matrix. A high speed computational algorithm for the Hadamard matrix is described in "Hadamard Transform Image Coding" by Pratt, Kane and Andrews, Proceedings of the IEEE, Jan. 1969, p. 58.

Depending upon the form of signal processing employed, i.e., serial or parallel, transform coder 12 must, of course, be correspondingly arranged. Assuming serial processing, an arrangement of the form illustrated in FIG. 4 may be used. With this arrangement, input signals are first stored in frame memory 40 and then supplied as a frame of signals to matrix coder 41. Frame memory 40 may take any desired form. For example, it may consist of an arrangement of delay lines with sufficient capacity to store one complete frame of video information. Alternatively, a shift register, buffer arrangement, or a recirculating delay line of the so-called deltic form may be used. Obviously, if parallel or frame processing is employed, the auxiliary frame memory is not required.

Transformed difference signals, identified as $s_e$ are thereupon delivered to quantizer apparatus 13 wherein they are represented at selected amplitude levels and delivered as signals $q$ either directly or after additional coding to an output system for transmission in accordance with well-known principles.

In order to predict the value of each incoming frame of video information, conventional closed-loop predictor techniques are employed. Accordingly, output signals $s_q$ (or, in the alternative, coded signals $s_c$) are decoded in transform decoder 14 to recover the original difference signal values. Transform decoder 14 is identical in basic operation to coder 12 but exhibits the inverse matrix format. It, too, may employ an auxiliary frame memory 40 illustrated in FIG. 4. The resulting decoded difference signal is combined in adder 15 with a predicted value of the frame signal to provide a reconstituted signal $s_r$. In the absence of quantizing noise or other distortions, reconstituted signals $s_r$ are true replicas of input video signals $s$ and may be used as desired at the transmitter location. It is this form of signal that is developed at the receiver. Reconstituted signals are thereupon supplied to predictor apparatus 11 which develops values of the next frame of video information on the basis of the reconstituted signals supplied to it.

Typical closed-loop prediction apparatus is described variously in the art, for example, in B. M. Oliver U.S. Pat. No. 2,732,424, granted Jan. 24, 1956. In short, predictor apparatus 11 may comprise a linear, invarient network employing a transversal filter and associated circuits as described in the Oliver patent. Quantizer 13, previously discussed, similarly may take any desired form, the units described and referred to in the Oliver patent being entirely satisfactory. Assuming frame signal processing, predictor 11 is selected to process supplied signals on a frame-to-frame basis as described by Oliver. Alternatively, an auxiliary frame memory may be employed to permit serial processing.

Figure 2:
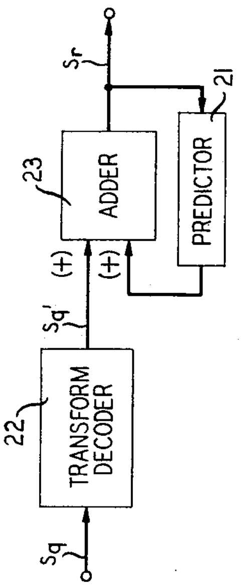
FIG. 2 is a block schematic diagram of receiver apparatus suitable for decoding received signals and reconstituting a picture signal.
Figure 4:
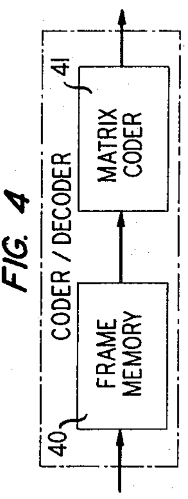
FIG. 4 is a block schematic diagram of a transform coder suitable for serial processing in accordance with the invention.

FIG. 2 shows a receiver suitable for recovering signals delivered from the apparatus of FIG. 1. Incoming signals $s_q$ are first delivered to transform decoder 22, identical in construction to transform decoder 14 at the transmitter station and which exhibits the inverse transform characteristic of coder 12. Depending upon the mode of processing, an auxiliary frame memory arrangement, as shown in FIG. 4, may be employed. Decoded frame signals $s_q'$ are supplied to adder 23 as errors in prediction and are added to the predicted value of the frame signals, supplied from predictor 21, to produce reconstituted signals $s_r$ for any desired use. Predictor 21, and indeed the entire reconstitution apparatus of FIG. 2, may be identical to the corresponding units 14, 15 and 11 in the apparatus of FIG. 1.

By virtue of the distributive property of transform coder 12, error signals transmitted to the receiver station are effectively distributed over the entire frame interval so that each transmitted frame signal is spatially more homogeneous than a mere frame of difference signals.

Figure 3:
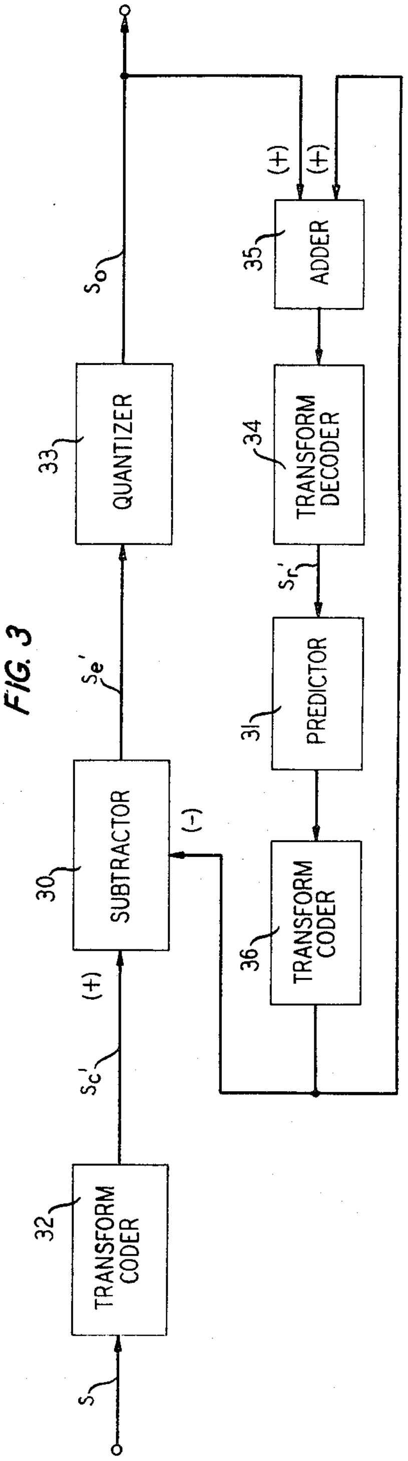
FIG. 3 is a schematic block diagram showing apparatus alternative to that shown in FIG. 1.

An alternative embodiment of the transform predictive coding apparatus of the invention is shown in FIG. 3. In this arrangement, transformation coding of a frame of video signals takes place prior to the delivery of transformed frame signal to the predictive loop. Thus, a frame of signals $s$, from a conventional camera source and store, or the like, is transformed in coder 32 as described above, i.e., by a suitable averaging matrix, and delivered to one input of subtractor 30. A frame of predicted values of the signal is delivered to the other input of subtractor 30 so that the output difference $s_e'$ represents the error between a predicted and the actual value of the transformed signal. The error difference signal is quantized in quantizer 33 and the resultant signal $s_o$ is delivered to an output terminal. Quantized error signal $s_o$ is also delivered to adder 35 where it is combined with a predicted value of the momentary frame of video signals. The output of the adder is supplied to transform decoder 34 to produce a signal $s_r'$, which, for no quantizing error, is equivalent to the input signal supplied to the system. This signal is used in predictor 31 to develop a value of the signal for the next succeeding picture element interval or intervals. The predicted value is once again subjected to transform coding in coder 36 and the coded predicted value signal is delivered to subtractor 30 and to adder 35. Output signal $s_0$ from the apparatus of FIG. 3 may be delivered to a receiver arrangement identical to that listed in FIG. 2.

The equivalence of the apparatus of FIG. 3 with that of FIG. 1 may be verified by inspection. The arrangement of FIG. 3, however, places the transform coder outside of the quantization path at the expense of an additional transform coder 36 in the predictor feedback loop. Such an arrangement may be advantageous from a construction standpoint or in those situations in which either the coder or the prediction loop are shared with signals in other circuits. If, however, the operation of the predictor and the transform coder are commutative, i.e., if their order of execution can be inverted, then the operations of transform decoder 34 and transform coder 36 cancel each other and both units may be eliminated from the circuit. Implementation may, therefore, be greatly simplified. This commutative property exists, for example, for arbitrary within-frame transformations if the predictor is a frame delay.

What is claimed is:

1. A system for encoding a video signal for transmission, which comprises, means including a predictor network in a feedback loop for developing a signal representation of the difference between an image frame of video signals and a prediction of said frame of video signals developed in said loop;

transform coding means included in said loop for distributing said difference signals homogeneously within said image frame of signals, means included in said loop for quantizing each of said difference signals within said homogeneous frame of signals to a selected number of amplitude levels, and output means for utilizing said quantized frame of transform coded difference signals as a representation of said image frame of video signals.

2. A system for encoding a video signal, as defined in claim 1, characterized in that, said transform coding means employs a two dimensional Hadamard matrix operator for dispersing said difference signals spatially in said image frame of signals.

* * * * *